S. C. BLODGETT.
Sewing Machine.
No. 613.
Reissued Oct. 12, 1858.
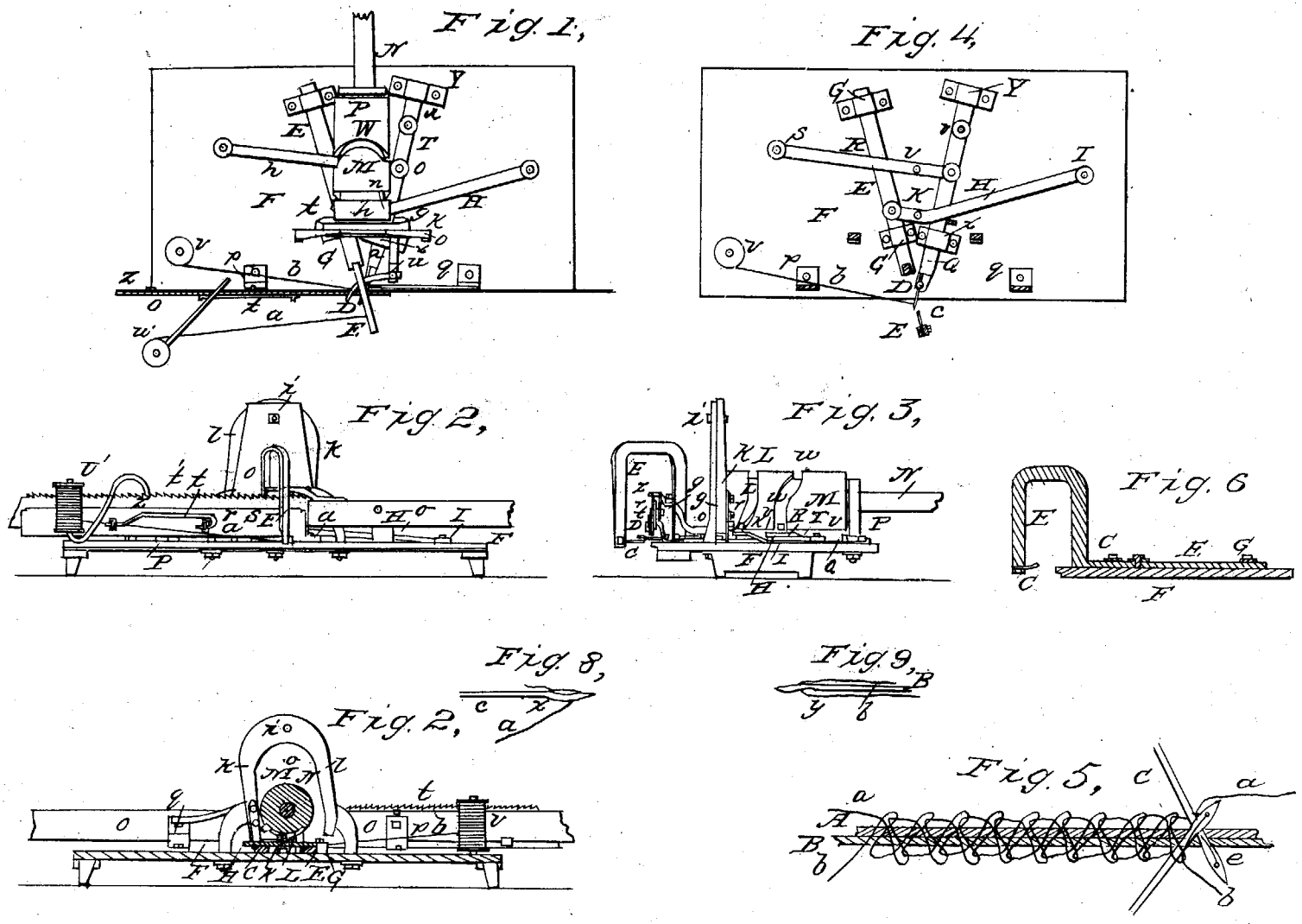
N. PETERS, Photo-Lithographer, Washington, D. C.

UNITED STATES PATENT OFFICE.

SHERBURNE C. BLODGETT, OF GEORGETOWN, ASSIGNOR, BY MESNE ASSIGNMENTS, TO O. B. POTTER, WM. O. GROVER, AND W. E. BAKER, OF BOSTON, MASSACHUSETTS.

IMPROVEMENT IN SEWING-MACHINES.

Specification forming part of Letters Patent No. 10,354, dated December 20, 1853; Reissue No. 613, dated October 12, 1858.

*To all whom it may concern:*

Be it known that I, SHERBURNE C. BLODGETT, of Georgetown, in the county of Essex and State of Massachusetts, have invented a new and useful machine or new and useful improvement in machinery for sewing cloth or such other material or articles to which the same may be applicable; and I do hereby declare that the same is fully described and represented in the following specification and accompanying drawings, letters, figures, and references thereof.

Of the said drawings, Figure 1 represents a top view of my said machine. Fig. 2 is a front elevation of it. Fig. 3 is an end elevation of it. Fig. 4 is a horizontal section of it, taken just above the needles by which the stitches are produced. Fig. 5 is a diagram exhibiting on an enlarged scale the manner in which the two threads used are looped and interlocked by the two needles used in order to sew together two pieces of cloth.

In said Fig. 5, A and B may be supposed to represent two pieces of cloth sewed together by two threads, *a* and *b*, which, in order to more clearly exhibit their loops, are not drawn close into the cloth. The two needles are shown at C and D. Each needle is made with a vertical hole or eye, *e* or *f*, made through it a short distance in the rear of its point. The thread *a* is passed upward through the eye of the needle C, while the thread *b* is passed downward through the eye of the needle D. In the operation of sewing or forming stitches by a machine of the form or construction as shown in the drawings, the needle D, having the thread *b* carried through it, is first passed through the two pieces of cloth or other material, and so as to cause its eye to project some distance beyond the piece A. The needle *c*, having the thread *a* run through it, is next passed between the lower side of the needle D and that part of the thread *b* which lies underneath the needle D, and directly between the eye *f* and the cloth, and far enough beyond the piece of cloth B to allow of the correct operation of the needle D when next passed through the cloth and between the thread *a* and the needle C. All this being effected, the needle D is next withdrawn from the cloth and forced through the loop of the other needle and the cloth. Next the needle C is operated as before described. The operation thus goes on, each needle being alternately withdrawn from the other and next passed through the loop of the other needle, or the same and the cloth, until the whole line of sewing or the seam is effected.

In Figs. 3 and 4, C and D denote the two needles. The former or front needle, C, is attached to or projected backward from the front end of the bent bar E, a longitudinal and vertical section of which and the needle are represented in Fig. 6. The said bent bar rests and is supported upon a bed-plate, F. It is sustained thereupon by one or more suitable guides or clasps, G, which allow it to move back and forth in a longitudinal direction sufficiently to draw the needle into and through the cloth and out of it to the extent required. The said bar E is jointed to one end of a horizontal vibrating bar, H, which turns horizontally at its opposite end on a center or joint pin, I, which passes through the bar and is affixed in the bed-plate, the joint or connection of the bars E and H being so made as to readily admit of a reciprocating longitudinal movement of the bar E in a straight line. A small stud, K, projects upward from the upper side of the bar H, and enters a cam-groove, L, made around the exterior of a cylinder, M, arranged and fixed on a horizontal driving-shaft, N, whose journals are supported by bearings affixed to two standards, O P, raised upon the bed-plate. The other needle, D, is also affixed into and projects from the front end of a horizontal bar, Q, arranged upon the bed-plate, as seen in the drawings. The said bar Q is supported on the top surface of the bed-plate by two clamps, X Y, through which it plays, and is not only to have a reciprocating longitudinal movement imparted to it, but should be allowed or caused to have such lateral movements as may be sufficient to permit it not only to move in one direction with and in the cloth when said cloth is moved, in order to produce a succession of stitches, but also, after it has been drawn out of the cloth, to move in the opposite direction a distance sufficient to return it to its original position or line of direction, in which it should next enter and pass through the cloth. The machinery which produces these movements is as follows:

R is a vibratory horizontal bar, which turns at one end upon a pin or center, *s*, projecting from the bed-plate. The opposite end of the bar R is jointed to one end of a short arm or bar, T, whose other end is jointed to or turns horizontally upon a pin, U, projecting from the bar Q, as seen in the drawings. A stud, V, projects from the upper side of the bar R, and is caused to enter a cam-groove, W, made in and around the cylinder M. Each of the aforesaid two cam-grooves W and L should be of such shape as may be required to produce the necessary longitudinal movements and intervals of rest of the needle attached to the needle-bar operated by said grooves. The front part of the bar Q passes through the clasp or staple X, the passage through which is to be made of a width in a direction crosswise of the bar sufficient to allow of the lateral movements of the bar. The lateral motion of the said bar and its needle is produced by the movement of the cloth, or it may be effected by a spring suitably applied. The return lateral movement of it is caused by a projection, *g*, affixed to a vibrating or pendulous frame, *p*, a rear view of which is seen in Fig. 7, which represents a vertical section of the machine, taken just in rear of the said frame, and through the stud K and transversely of the cam-cylinder, the said section being taken as if the spectator were looking toward the front part of the machine. The said frame is composed of two arms, *k l*, united together and suspended on a joint-pin, *i*. One of said arms extends down one side of the cam-cylinder, and the other on the other side of it.

There is a small stud or cam, *n*, inserted in and made to project from the cam-cylinder in such a manner as to alternately come in contact with each arm *k l* of the frame during each revolution of the said cam-cylinder, and thereby produce a vibratory or pendulous movement of it. When the said cam *n* acts against the arm *l* of the frame, it will so move the frame as to carry the projection *g* against the needle-bar Q, and move the same laterally to the extent required to carry the needle back into the line of direction in which it is next to pass through the cloth.

The cloth to be sewed is confined to a cloth bar or carriage, *z*, which is supported by and moves upon a horizontal bar, *o'*, sustained in position above the bed-plate by two standards, *p q*. The said carriage should be so applied to its sustaining-bar as to admit of a horizontal movement thereon from one end of it toward the other end of it. The carriage may be made in any suitable manner, or it may be composed of two clamp-plates, *r s t*, confined together by screws, or a hook, *b*, the upper edges of the cloth to be sewed being placed or inserted and held between said plates, the cloth being suffered to hang down below the rest-bar.

A rack of teeth, *t'*, is made on the top of the carriage. Into this rack a drawing spring-pawl, *u*, works, the said pawl being made to project from the frame *h* and to be moved by it in one direction over the teeth of the rack, and in the other direction, or back again, so as to gradually move the carriage or cloth-bar with successive intervals of rest, in order that the formation of the stitches may be progressive and regular.

In the drawings the thread *a* is represented as passing from a bobbin, *u'*, to the under side of the needle C, thence upward and through the eye of said needle. The other thread, *b*, is also shown as passing from a bobbin, *v*, thence to the upper side of the needle D, and downward through the eye of the same. The said bobbin should be so applied to the bed-plate as to be capable of revolving and delivering out the threads as fast as necessary, and in order to draw the threads or loops closely into the cloth any mechanical contrivance suitable therefor may be employed. Fig. 8 denotes a side view of the needle C, and Fig. 9 a side view of the needle D, the same being shown on an enlarged scale. The former, it will be seen, is made with a small bend or depression, *x*, on its upper side and just in the rear of its eye. The latter has a similar depression, *y*, in its lower side.

The bend or depression in each needle is for the purpose of favoring the admission of the point of the other needle between it and the thread of it. When the needle secured to the bar Q is moved laterally, as I have described, in one direction by the spring acting on its needle-bar, and in the opposite direction by the operation of the pendulous frame *h*, the needle, being in the cloth during the direct movement and out of it during the reverse movement, imparts successive movements to the cloth in the direction in which it is to be moved to form the successive stitches. The needle thus constitutes an instrument for feeding cloth through the machine, and its agency as such an instrument will depend upon the circumstances under which the machine may be used. If the work be heavy, so that a considerable force is required to move it, the use of a distinct moving or feeding mechanism in addition to the needle may be necessary; but if the amount of force required be light in proportion to the strength of the spring, the needle alone feeds the cloth or moves it the necessary distance to form the successive stitches.

Having thus set forth my invention, I wish it distinctly understood that I do not limit it to the employment of all or either of such mechanical contrivances for moving either of the needles or the cloth as I have specified, as others well known as mechanical equivalents may be substituted for them; neither do I confine my improvement to the precise form or forms, arrangement or arrangements, of all or any of its parts, as circumstances may vary the same without changing the nature of the invention.

What I claim as my invention is—

1. The formation of sewing in cloth or other material by the interlocking of two threads by the conjoint action of two needles in such manner that each needle shall be made to carry a loop of thread through a loop formed by the other needle and through the cloth, whereby one thread serves as a binding-thread to the other, substantially in the manner described.

2. Moving the cloth to be sewed by a needle or its equivalent operating, substantially as herein set forth, to pierce the cloth and move it the necessary distance required to form successive stitches.

In testimony whereof I have hereunto subscribed my name.

SHERBURNE C. BLODGETT.

Witnesses:
HENRY COY,
WILLIAMS OGLE.